Aug. 9, 1955    F. M. GUY    2,715,051
SHAFT HANGER
Filed May 27, 1950    2 Sheets-Sheet 1
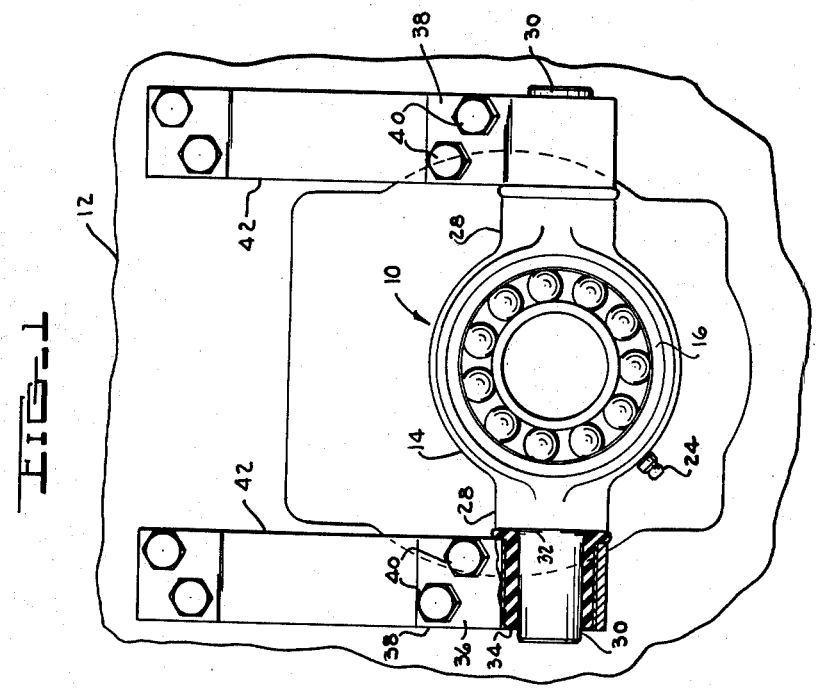
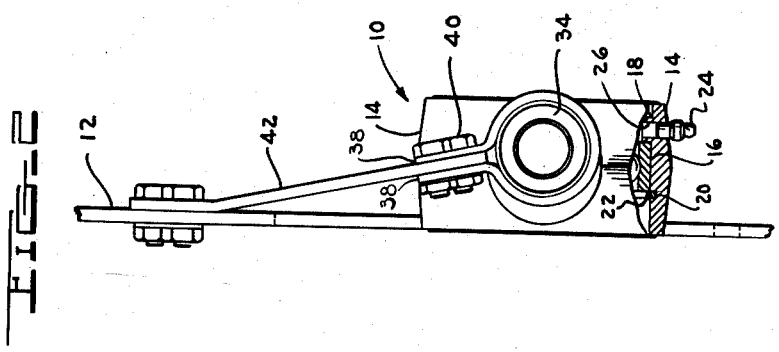
INVENTOR.
FREDERICK M. GUY
BY
ATTORNEY Aug. 9, 1955
F. M. GUY
2,715,051
SHAFT HANGER
Filed May 27, 1950
2 Sheets-Sheet 2
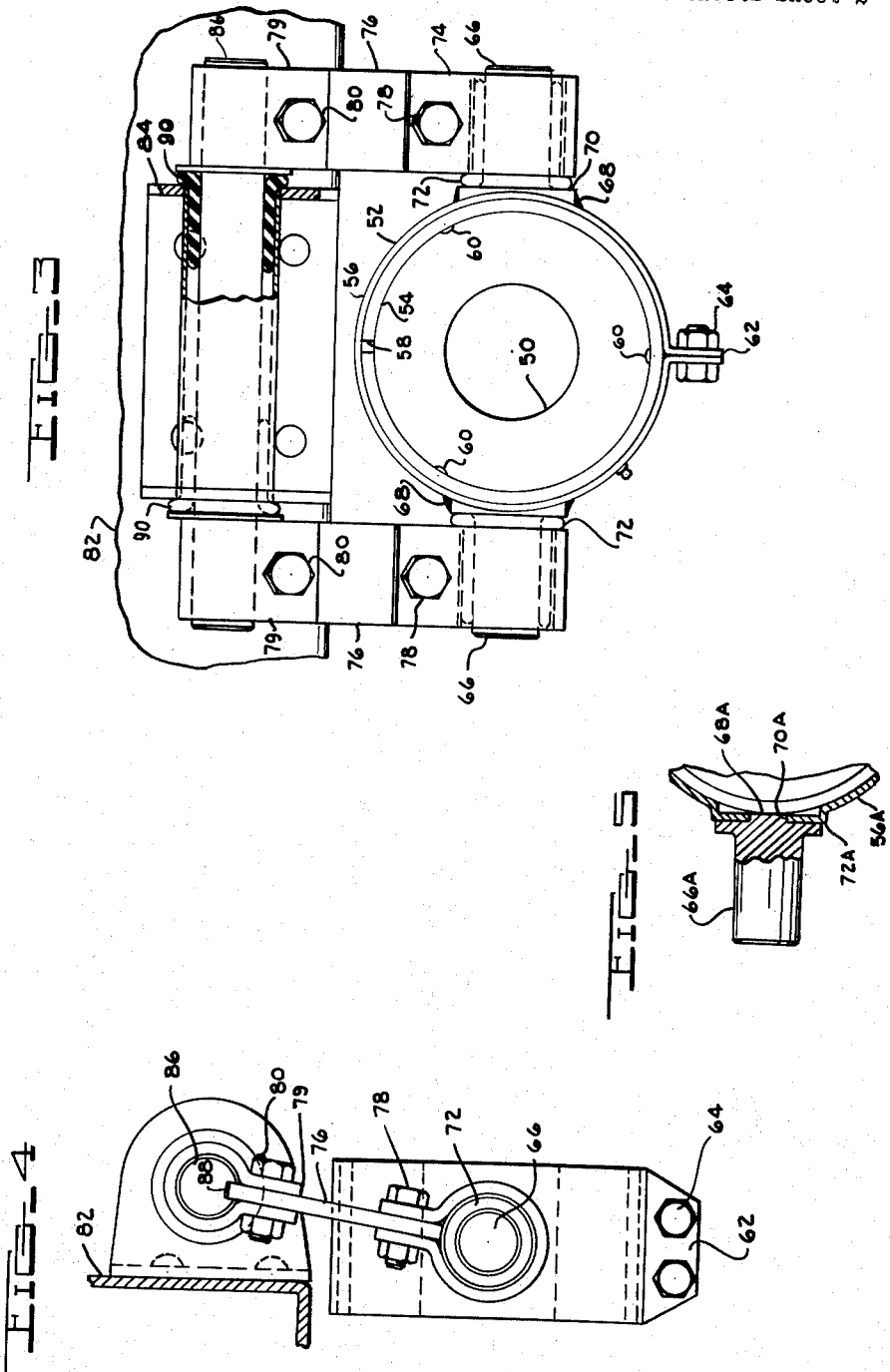
INVENTOR.
FREDERICK M. GUY
BY
Arthur M. Smith
ATTORNEY United States Patent Office 2,715,051
Patented Aug. 9, 1955

2,715,051

SHAFT HANGER

Frederick M. Guy, Detroit, Mich., assignor to U. S. Universal Joints Company, Detroit, Mich., a corporation of Michigan Application May 27, 1950, Serial No. 164,713

2 Claims. (Cl. 308—28)

The present invention relates to a resilient shaft hanger which is adapted for universal application, and is intended as one of its applications, to be used in motor vehicle constructions to provide a flexible support for a driven shaft or the like, which will be subjected to forces causing movement relative to a supporting member. This invention is an improvement on the resilient shaft hanger disclosed in my prior United States Patent No. 2,450,279 of September 28, 1948.

The present invention distinguishes over the invention of my prior patent in providing a bearing housing member having a simplified construction so that it can be more economically produced and in providing hanger arms which also can be more economicaly produced and which can be made in a plurality of lengths to be used interchangeably with a bearing housing member whereby more universal application of the bearing housing member can be made and tooling and machining of forged parts can be avoided.

It is among the objects of the present invention to provide an improved resilient shaft hanger which has a bearing container member constructed in a relatively simple manner, and hanger arms simply constructed enabling standard parts to be utilized for shaft hangers requiring different lengths of the hanger arms permitting more universal application thereof and eliminating tooling and accurate boring of forged parts as was heretofore required.

It is a further object of the present invention to provide a resiliently mounted hanger adapted for use in supporting a rotating shaft to permit movement thereof relative to the supporting surface by means of a resilient hanger member in which a resiliently cushioned movement of the parts relative to each other is permitted while the parts are acoustically insulated.

It is a further object of the present invention to provide a resilient shaft hanger in which all vibrations transmitted between the shaft and the supporting member is absorbed in a resilient sound deadening absorbing medium.

Other objects of this invention will appear in the following description and appended claims, reference being had to the accompanying drawings forming a part of this specification wherein like reference characters designate corresponding parts in the several views.

In the drawings:

Fig. 1 is a front elevational view of one form of the present invention mounted in an operative position on a supporting member.

Fig. 2 is a side elevational view partly in section of the form of the present invention shown in Fig. 1.

Fig. 3 is a front elevational view partly in section of a modified form of the invention shown in Fig. 1.

Fig. 4 is a side elevational view partly in section of the modified form of the invention shown in Fig. 3.

Fig. 5 is a fragmentary sectional view of another modification of the invention showing a modified construction for assembling the outwardly extending stud on the housing for the bearings.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, three modifications of the present invention are shown which are primarily adapted to be used twith a motor vehicle as explained and for the purposes set forth in the aforesaid Patent No. 2,450,279.

One modification of the present resilient shaft hanger is illustrated in Figs. 1 and 2 of the drawings to which reference is now made. The shaft hanger 10 is shown mounted on a cross frame 12, or the like, of a motor vehicle and it includes a housing 14 suitably constructed to carry a shaft journaling bearing 16. This latter has an internal diameter of sufficient size for receiving a rotatable shaft (not shown) of the motor vehicle.

The housing 14 has a cylindrical inner wall within which the shaft journaling bearing 16 is mounted. An inwardly extending annular shoulder 18 is integrally formed in said inner wall providing an abutment against which the shaft journaling bearing is located. An annular slot 20 is formed in the inner wall of said housing and is in a spaced parallel relationship with said annular shoulder and is adapted to receive a spring retainer member 22 for holding the shaft journaling bearing in place.

A grease fitting 24 is suitably secured within an opening 26 in the wall of the housing 14. When the resilient shaft hanger 10 is in use lubricant can be supplied to the shaft journaling bearing through the fitting 24. Grease retaining members (not shown) are provided on each end of the housing 14 for retaining the grease therein.

A pair of studs 28 extend radially outwardly from opposite sides of the cylindrical housing 14. The outer ends of each of the studs 28 are machined to a reduced diameter forming a shoulder 32. A resilient sleeve or bushing 34 surrounds each of the reduced end portions 30 and is seated against the shoulder 32. Annular clamping members 36 clamp the bushings 34 under pressure to the end portions 30. The annular clamp members 36 have spaced end portions 38 through which bolts 40 extend for securing the annular clamp members 36 to arms 42. The upper ends of the arms 42 are shown as being secured to the cross frame 12 or the like.

It can be seen from the above description that this modification of the present invention provides a simplified construction for the bearing housing and the hanger arms over the resilient shaft hanger shown in the aforesaid Patent No. 2,450,279. Also, the present construction has a more universal application than the resilient shaft hanger of the said patent. As can be seen, in order to provide more universal application, the only parts that need be formed of different lengths are the arms 42, and when arms of a plurality of lengths are provided, any desired spacing of the shaft and bearing from the supporting surface 12 can be obtained. This construction eliminates tooling and accurate boring of the forged parts which are required for conventional constructions of the type shown in the aforesaid patent.

Further, it can be seen that the present construction permits relative movement between the rotating shaft and the supporting member of the vehicle, and there is no direct metal to metal contact between the shaft and the supporting member because of the resilient rubber bushings 34 being interposed between the clamping members 36 and the studs 28, which act to acoustically insulate transmission of sound from the shaft to the supporting member.

Reference is now made to Figs. 3 and 4 for a showing of a modified form of the present invention. Here, the main bearing 50 for the rotatable drive shaft (not shown), is held in position by a housing 52 which includes a split inner band 54 and an outer band 56. The inner band 54 is provided with a spaced end portion 58 which provides for an air vent through the bearing and also permits the band 54 to expand or contract as is required to maintain a tight contact on the bearing 50. A plurality of lugs 60 are formed on the inner circumference of the band 54 and act to locate and to center the bearing in the housing 52. For this purpose there generally will be two rows of lugs 60 with the bearing race therebetween. The inner band is clamped to the bearing 50 by the outer band 56 which is open at the outwardly extending end portion 62 which is drawn into the closed position by means of the nut and bolt 64. Each of the bands 54 and 56 is preferably made from rolled strip steel.

Secured to opposite sides of the housing 52 and extending outwardly therefrom are studs 66 which are secured to the outer band 56 by any suitable means such as welding, for example, as is shown at 68. The studs are machined to proper size prior to being welded to the housing 52 and include the shoulder portion 70. Resilient rubber bushings 72 surround the stud 66 and are seated against the shoulder 70 in the same manner as was described with respect to the bushings 34 of the previously described modification. Bushings 72 are clamped in place by an annular clamping member 74 which is secured to the arm 76 by the nut and bolt 78. The upper end of each of the arms 76 is secured to an annular clamping member 79 by means of the bolt and nut 80.

Mounted on the cross frame 82, or the like, of the vehicle is a bracket member 84 in which is mounted a shaft 86, the ends of which are clamped by the clamp members 79. A groove 88 extends longitudinally of the shaft 86, as can be seen in Fig. 4, into which the upper ends of the arms 76 project so as to lock the arms 76 in a preadjusted position whereby subsequent swinging movement is transmitted into rotational movement of the shaft 86. Such swinging movement is dampened and cushioned by the resilient bushing 90 which is interposed between the shaft 86 and the bracket 84.

The present modification of the invention provides for the housing carrying the journaling bearing to be made of strip steel and also provides for the formation of the arms and connecting members of strip steel. This construction permits a greater preloading of the resilient bushing by the pressure applied thereto and results in the formation of a more universal type of mounting bracket. As can be readily seen, more universal application can be made of the bearing housing structure and the mounting bracket as standard parts merely by providing arms 76 of different lengths. As pointed out above with respect to the modification of Figs. 1 and 2, this construction eliminates tooling and accurate boring of forged parts which are required by conventional constructions and permits a more general use of the mounting bracket and bearing housing member. This form of the invention is preferred in use over the form of the invention described in Figs. 1 and 2 in instances where it is found necessary for the resilient shaft hanger to absorb relatively great longitudinal vibration of the shaft.

Fig. 5 shows a modified form of the stud and outer band structure shown in Figs. 3 and 4. Here the stud 66A is shown having a cylindrical lug projecting inwardly from its inner end into an aperture 70A in the outwardly stamped portion 72A of the outer band 56A. This construction has the advantage of providing a more positive location of the stud 66A with respect to the housing 56A.

Having thus described my invention, what I claim is:

1. A resilient shaft hanger comprising two depending arms secured to a supporting member, annular clamp means removably attached to the depending end of each arm, a housing, a shaft journaling bearing carried in said housing, a pair of outwardly extending studs secured to said housing, each of said studs being journaled in a rubber bushing clamped under pressure in each of said clamp means, said housing being formed from an inner annular member having means on its inner circumference for locating said bearing and an outer annular member adapted to be clamped around said inner annular member.

2. A resilient shaft hanger comprising a bracket secured to a supporting member, a stud resiliently mounted in bushings carried in said bracket, a housing adapted to carry a shaft journaling bearing and having a pair of outwardly extending studs attached thereto, said second-named studs having rubber bushings mounted thereon, a pair of arms extending between said bracket and said housing for supporting the latter a fixed distance from the former, first clamp members mounted on the first-named stud and detachably connected to one end of said arms, and second clamp members detachably connected to the other end of said arms and mounted on said second mentioned rubber bushings to hold the same in compression, said first-named stud having a keyway for receiving the ends of said arms to prevent relative rotation therebetween.

References Cited in the file of this patent

UNITED STATES PATENTS

| Number | Name | Date |
| --- | --- | --- |
| 1,146,396 | Boardman | July 13, 1915 |
| 1,702,124 | Matthes | Feb. 12, 1929 |
| 2,246,847 | Herreshoff | June 24, 1941 |
| 2,341,821 | Schwinn | Feb. 15, 1944 |
| 2,395,143 | Prewitt | Feb. 19, 1946 |
| 2,450,279 | Guy | Sept. 28, 1948 |
| 2,479,791 | Strunk | Aug. 23, 1949 |

FOREIGN PATENTS

| 477,183 | France | Sept. 29, 1915 |